(12) United States Patent
Babalou et al.

(10) Patent No.: US 10,882,278 B2
(45) Date of Patent: Jan. 5, 2021

(54) PALLADIUM COMPOSITE MEMBRANE

(71) Applicants: Ali Akbar Babalou, Tabriz (IR); Sona Jamshidi, Tabriz (IR)

(72) Inventors: Ali Akbar Babalou, Tabriz (IR); Sona Jamshidi, Tabriz (IR)

(*) Notice: Subject to any disclaimer, the term of this patent is extended or adjusted under 35 U.S.C. 154(b) by 535 days.

(21) Appl. No.: 15/650,922

(22) Filed: Jul. 16, 2017

(65) Prior Publication Data

US 2017/0368797 A1 Dec. 28, 2017

Related U.S. Application Data

(60) Provisional application No. 62/374,919, filed on Aug. 15, 2016.

(51) Int. Cl.
*C23C 18/16* (2006.01)
*C23C 18/18* (2006.01)
(Continued)

(52) U.S. Cl.
CPC .............. *B32B 15/018* (2013.01); *B32B 1/08* (2013.01); *B32B 5/16* (2013.01); *B32B 9/005* (2013.01); *B32B 9/04* (2013.01); *B32B 9/041* (2013.01); *B32B 15/04* (2013.01); *B32B 15/08* (2013.01); *B32B 15/16* (2013.01); *B32B 17/061* (2013.01); *C01B 3/505* (2013.01); *C01F 7/025* (2013.01); *C03C 17/36* (2013.01); *C03C 17/3618* (2013.01); *C03C 17/3649* (2013.01); *C03C 17/3697* (2013.01); *C04B 41/00* (2013.01); *C04B 41/009* (2013.01); *C04B 41/52* (2013.01); *C04B 41/90* (2013.01); *C22C 5/04* (2013.01);
(Continued)

(58) Field of Classification Search
CPC ... C23C 18/16; C23C 18/18; C23C 18/20–54; C23C 18/42; C23C 18/44; C23C 18/1837; C23C 18/1851; C23C 18/1872; C23C 18/1886; C23C 18/1896
USPC ... 427/97.9, 99.5, 304, 305, 306, 437, 443.1
See application file for complete search history.

(56) References Cited

U.S. PATENT DOCUMENTS 8,052,775 B2 11/2011 Hou et al.
2008/0176060 A1* 7/2008 Harold ............... B01D 67/0041
428/316.6

FOREIGN PATENT DOCUMENTS

JP 2007229616 A 9/2007
JP 4893992 B2 3/2012
(Continued)

OTHER PUBLICATIONS

Tong, Thin Pd membrane on α-Al2O3 hollow fiber substrate without any interlayer by electroless plating combined with embedding Pd catalyst in polymer template, 2008, Journal of Membrane Science, vol. 310, p. 93-101 (Year: 2008).*

(Continued)

*Primary Examiner* — Dah-Wei D. Yuan
*Assistant Examiner* — Nga Leung V Law
(74) *Attorney, Agent, or Firm* — Bajwa IP Law Firm; Haris Zaheer Bajwa

(57) ABSTRACT

A composite membrane for hydrogen separation and purification, including: a modified and activated support, a Palladium (Pd) layer, and an interstice layer between the second surface-modifying layer and the Pd layer. The support includes a support substrate, a first surface-modifying layer on the support substrate, and a second surface-modifying layer on the first surface-modifying layer.

13 Claims, 20 Drawing Sheets

(51) Int. Cl.
- B32B 15/01 (2006.01)
- C01F 7/02 (2006.01)
- C22C 5/04 (2006.01)
- B32B 15/08 (2006.01)
- C03C 17/36 (2006.01)
- B32B 1/08 (2006.01)
- B32B 9/04 (2006.01)
- B32B 15/16 (2006.01)
- C01B 3/50 (2006.01)
- B32B 17/06 (2006.01)
- C04B 41/90 (2006.01)
- C04B 41/00 (2006.01)
- B32B 9/00 (2006.01)
- B32B 15/04 (2006.01)
- B32B 5/16 (2006.01)
- C04B 41/52 (2006.01)
- C01B 13/00 (2006.01)

(52) U.S. Cl.
CPC ....... *B32B 2255/00* (2013.01); *B32B 2255/04* (2013.01); *B32B 2255/06* (2013.01); *B32B 2255/20* (2013.01); *B32B 2255/205* (2013.01); *B32B 2255/26* (2013.01); *B32B 2255/28* (2013.01); *B32B 2264/107* (2013.01); *B32B 2307/538* (2013.01); *B32B 2307/724* (2013.01); *C01B 13/00* (2013.01); *C03C 2217/425* (2013.01)

(56) References Cited

FOREIGN PATENT DOCUMENTS

| | | |
|---|---|---|
| JP | 5273496 B2 | 8/2013 |
| JP | 5464422 B2 | 4/2014 |

OTHER PUBLICATIONS

Babaluo, A modified model for alumina membranes formed by gel-casting followed by dip-coating, 2004, Journal of the European Ceramic Society, vol. 24, p. 3779-3787 (Year: 2004).*

Jianhua Tong et al., "Thin Pd membrane on -Al2O3 hollow fiber substrate without any interlayer by electroless plating combined with embedding Pd catalyst in polymer template", Journal of Membrane Science, 2008, pp. 93-101, vol. 310.

Jianhua Tong et al., "Thin and defect-free Pd-based composite membrane without any interlayer and substrate penetration by a combined organic and inorganic process", Chem. Commun., 2006, pp. 1142-1144.

* cited by examiner

PALLADIUM COMPOSITE MEMBRANE

CROSS REFERENCE TO RELATED APPLICATION

The present application claims priority from U.S. Provisional Patent Application Ser. No. 62/374,919, filed Aug. 15, 2016, entitled "PALLADIUM COMPOSITE MEMBRANE", which is incorporated by reference herein in its entirety.

TECHNICAL FIELD

The present application generally relates to a composite membrane for Hydrogen separation and purification, and more particularly, to a Palladium (Pd) based composite membrane and fabrication method thereof.

BACKGROUND

Increasing demands for pure hydrogen in several operational areas, such as petroleum, metallurgical, electronics, fuel cells, and petrochemical processes make hydrogen production and purification extremely important and valuable. Membrane separation technology has an economic potential to reduce operating costs, minimize unit operations, and lower energy consumption for $H_2$ separation and purification.

The development of effective hydrogen membranes, such as the palladium (Pd) membrane has garnered considerable interest due to industry requirements for commercial applications due to high hydrogen permeability and selectivity versus other gases. Therefore, a lot of research has been conducted for the preparation and application of Pd membranes. Among the various techniques for the fabrication of Pd and/or its alloy membranes, electroless plating (ELP) technique provides significant advantages over other alternatives including its applicability to non-conductive substrates with complex shapes, low-cost materials and equipment, and simple equipment. However, ELP involves big pore sizes and roughness of substrate surfaces that prohibit direct deposition of thin and defect-free Pd-based layers on the substrates.

Therefore, there is a need for a mechanically and thermally stable, low-cost, and long-term durable Pd-based composite membrane with a high hydrogen permeability efficiency. Also, there is a need to provide and develop a Pd-based composite membrane including a support with a relatively roughened surface to overcome various shortcomings related to the Pd composite membranes including the undesired high roughness and big pore size of the support substrate, composite delamination due to a high smooth support, Pd layer and support mismatching, anchoring effects that reduce membrane stability, etc.

SUMMARY

In one general aspect of the present disclosure, a composite membrane for hydrogen separation and purification is disclosed. The composite membrane may include a modified and activated support, a Palladium (Pd) layer, and an interstice layer between the second surface-modifying layer and the Pd layer. The modified and activated support may include a support, a first surface-modifying layer on the support, and a second surface-modifying layer on the first surface-modifying layer.

In an exemplary implementation, the support may include a ceramic support, a metallic support, a glass support, or combinations thereof. In an exemplary embodiment, the support may have a tubular or a platelet shape and may be fabricated through one of the processes, including gel-casting, extruding, injection molding, slip casting, compression molding, or combinations thereof. In an exemplary embodiment, the support may include a tubular α-alumina support fabricated from α-alumina powder through a gel-casting process.

In an exemplary embodiment, the first surface-modifying layer and the second surface-modifying layer may include a porous material. The first surface-modifying layer and the second surface-modifying layer may include one of $TiO_2$, $SiO_2$, $CeO_2$, $ZrO_2$, $Y_2O_3$, Boehmite, γ-Alumina, or combinations thereof.

In an exemplary embodiment, the modified and activated support may have a relative roughness in a nanometric scale of less than about 100 nm. The interstice layer may have a thickness of less than about 100 nm.

In an exemplary embodiment, the interstice layer may be formed via an organic-inorganic surface activation process using a polymeric solution. The polymeric solution may include a polymer matrix, and a plurality of Pd nanoparticles in the polymer matrix. In an exemplary embodiment, the polymer matrix may include one of poly-(ethylene glycol) (PEG), poly-(vinyl alcohol), poly-(vinyl pyrolidone), poly-(2,6-dimethyl-4-phenylene oxide), phenol resin, polyester, polyamide, polyimide, polyamide imido, polyvinyl chloride, poly-vinylidene chloride, poly-(ether sulfone), or combinations thereof.

In an exemplary embodiment consistent with principles of the present disclosure, a method for fabricating a composite membrane for hydrogen separation and purification is disclosed. The method may include coating a first surface-modifying layer onto a support, coating a second surface-modifying layer onto the first surface-modifying layer to obtain a surface-modified support, organic-inorganic activating the surface-modified support to obtain a surface-activated support, and depositing a Pd layer on the surface-activated support.

In an exemplary implementation, the support may include a ceramic support, a metallic support, a glass support, or combinations thereof. In an exemplary embodiment, the support may have a tubular or a platelet shape and may be fabricated through one of the processes, including gel-casting, extruding, injection molding, slip casting, compression molding, or combinations thereof. In an exemplary embodiment, the support may include a tubular α-alumina support fabricated from α-alumina powder through a gel-casting process.

In an exemplary implementation, the method may further include fabricating the support, and cleaning the fabricated support. In an exemplary embodiment, the support may be fabricated using one process of gel-casting, extruding, injection molding, slip casting, compression molding, or combinations thereof.

In an exemplary embodiment, the first surface-modifying layer and the second surface-modifying layer may include a porous material. The first surface-modifying layer and the second surface-modifying layer may include one of $TiO_2$, $SiO_2$, $CeO_2$, $ZrO_2$, $Y_2O_3$, Boehmite, γ-Alumina, or combinations thereof.

In an exemplary embodiment, coating the first surface-modifying layer onto the support may include dipping the support in a solution or a suspension of a pore-size surface-modifying agent to obtain the first surface-modifying layer coated on the support substrate, drying the first surface-modifying layer, and calcination/sintering the first surface-modifying layer in an electric furnace.

In an exemplary embodiment, coating the second surface-modifying layer onto the first surface-modifying layer may include dipping the support substrate including the first surface-modifying layer in a solution or a suspension of a roughness surface-modifying agent to obtain the surface-modified support, drying the surface-modified support, and calcination/sintering of the dried surface-modified support.

In an exemplary embodiment, organic-inorganic activating the surface-modified support may include coating a layer of a polymeric solution on the surface-modified support. In an exemplary embodiment, the polymeric solution may include a polymer matrix, and a plurality of Pd nanoparticles in the polymer matrix. In an exemplary embodiment, the polymer matrix may include one of poly-(ethylene glycol) (PEG), poly-(vinyl alcohol), poly-(vinyl pyrolidone), poly-(2,6-dimethyl-4-phenylene oxide), phenol resin, polyester, polyamide, polyimide, polyamide imido, polyvinyl chloride, poly-vinylidene chloride, poly-(ether sulfone), or combinations thereof.

In an exemplary embodiment, depositing the Pd layer on the surface-activated support may include pre-electroless plating of a first Pd layer on the surface-activated support, and electroless plating of a second Pd layer on the first Pd layer. In an example, an underside surface of the Pd layer may have a relative roughness resembling a relative roughness of the surface-activated support.

DETAILED DESCRIPTION

Figure 1:
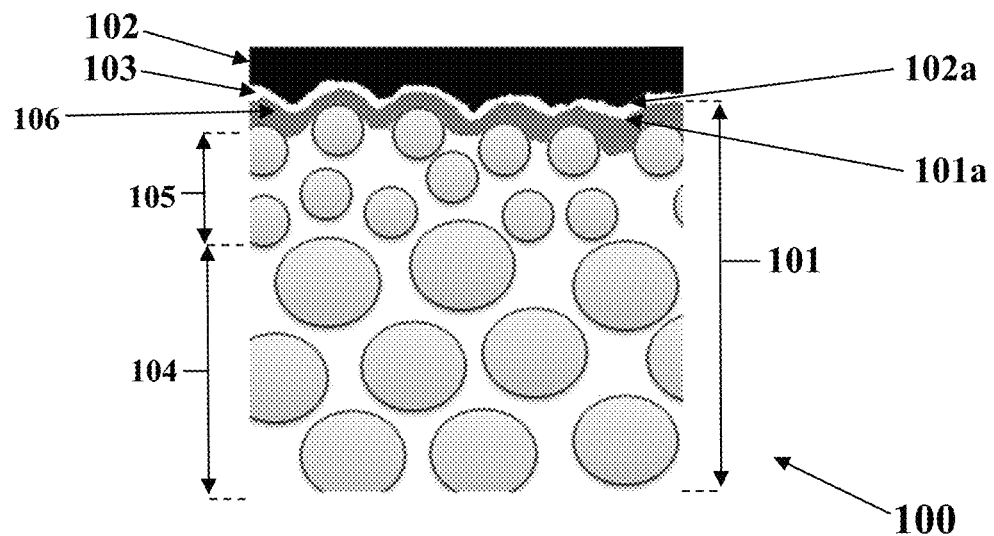
FIG. 1 illustrates a schematic of a composite membrane for hydrogen separation and purification, consistent with one or more exemplary embodiments of the present disclosure.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Some of the problems with the Pd or Pd alloy membranes relate to low hydrogen flux, high cost/price, and thermal and chemical instability of the membrane over a long term period. If the Pd or Pd alloy membrane layer is placed on a support with a high smooth surface, there is not an appropriate interaction between the Pd layer and the support surface. Hence, the membrane stability is significantly reduced so that a delamination may occur or the Pd layer may be peeled when a thermal shock occurs. On the other hand, when the Pd or Pd alloy membrane layer is placed on a support with a high roughened surface, the Pd layer is anchored onto the support surface. Since thermal coefficients of the support and Pd layer are different, there is a thermal mismatching between these two anchored layers so that some defects may be created on the Pd layer when a thermal shock occurs. Therefore, the stability of a Pd-based composite membrane may be increased by controlling the surface roughness of the support at a moderate level.

Furthermore, stability of a Pd-based composite membrane may be enhanced by creating a small gap between the Pd-based membrane and the support surface to reduce the effect of the large pore size and roughness of the substrates. However, the large membrane thickness leads to a low hydrogen permeability and costly membrane fabrication; thus, a thin gap layer may be desirable.

Therefore, an exemplary Pd based composite membrane with a modified and activated support surface with an ultra-thin interstice between the Pd layer and the support surface is disclosed herein. The disclosed exemplary surface modifications may lead to a controlled pore size and roughness for the support surface so that a Pd composite membrane with a relative surface roughness may have more efficiency in Hydrogen separations and purifications than those with a high roughened or a smooth surface. Moreover, forming an ultra-thin interstice layer between the Pd layer and the support surface with suitable roughness may increase the membrane stability even at unexpected thermal and mechanical conditions. The fabricated Pd layer herein may be a uniform layer that may have a high permeability and efficiency for Hydrogen separation and purification.

In addition, an exemplary method for fabricating the Pd composite membrane is disclosed. In a conventional fabricating method, especially, in a conventional surface activation method while preparing a Pd composite membrane, high hydrogen permeability may be attained but the respective preparation procedure is troublesome where the welding zone of a tubular membrane could be vulnerable forming defects. Herein, a gap with a nanometer thickness may be created between the Pd layer membrane and the porous substrate utilizing an organic-inorganic method as an activation step of ELP method. So, Pd nanoparticles may be used as a catalyst for the fabrication of the Pd membrane layer via ELP that may be embedded in a polymer template film and may be uniformly deposited on a porous substrate. Then, the polymer template may be removed during a heat treatment, resulting in a small interstice between the porous substrate and the Pd layer.

Furthermore, the pore size of the porous support influences the fabrication of the Pd membrane. The exemplary porous support disclosed here has a relative roughened surface and small pore size that may help in forming a thin and defect-free palladium membrane. So, two types of support modifications may be applied to obtain relative smoothness or roughness of a ceramic support to avoid pinholes during the Pd composite membrane preparation process. After activation of the modified support by the organic-inorganic method, thin dense Pd composite membranes may be fabricated by vacuum electroless plating (VELP) on the modified support. Also, Hydrogen permeation performance through the exemplary Pd membrane is investigated herein.

FIG. 1 shows a schematic of a composite membrane 100 for Hydrogen separation and purification, consistent with one or more exemplary embodiments of the present disclosure. The composite membrane 100 may include a Pd composite membrane, where a Pd layer may be an active membrane layer for Hydrogen separation and purification processes. The composite membrane 100 may include a modified and activated support 101, a Palladium (Pd) layer 102, and an interstice layer 103 between the modified and activated support 101 and the Pd layer 102. The modified and activated support 101 may include a support 104, a first surface-modifying layer 105 on the support 104, and a second surface-modifying layer 106 on the first surface-modifying layer 105.

In some exemplary implementations, the support 104 may include one of ceramic support, metallic support, glass support, Vycor glass support, or combinations thereof. The support 104 may have a tubular, or platelet (disc) shape and may be fabricated utilizing one of processes, including gel-casting, extruding, injection molding, slip casting, compression molding, or combinations thereof. In an exemplary embodiment, the support 104 may include a tubular α-alumina support fabricated from α-alumina powder through a gel-casting process.

In an exemplary implementation, the first surface-modifying layer 105 and the second surface-modifying layer 106 may include a porous material. In an exemplary embodiment, the porous material may include one of $TiO_2$, $SiO_2$, $CeO_2$, $ZrO_2$, $Y_2O_3$, Boehmite, γ-Alumina, or combinations thereof. The porous material may have manageable pore size and/or surface roughness to conduct a controlled and desired pore size and surface roughness for the modified and activated support 101. In an exemplary embodiment, the first surface-modifying layer 105 and the second surface-modifying layer 106 may be coated on the support 104 by dipping the support 104 in a suspension or solution of the porous material. Inserting the first surface-modifying layer 105 and the second surface-modifying layer 106 as intermediate layers between the top Pd-based membrane (Palladium (Pd) layer 102) and the support 104 may reduce any inherent defects of the support and prevent the infiltration if the top layer material into the pores of the support.

In an exemplary implementation, the first surface-modifying layer 105 and the second surface-modifying layer 106 may include a combination of two or more porous material. For example, the first surface-modifying layer 105 may include a $TiO_2$-Boehmite layer. The $TiO_2$-Boehmite layer may be coated on the surface of the support 104 by dipping the support 104 into a $TiO_2$-Boehmite suspension. The first surface-modifying layer 105, for example, the $TiO_2$-Boehmite layer may fill within the large pore size of the support 104 that may be utilized to modify the pore size of the support 104.

In an exemplary implementation, the second surface-modifying layer 106 may include a γ-alumina layer. The γ-alumina layer may be coated on the first surface-modifying layer 105 by dipping the support 104, which may be previously surface-modified with the first surface-modifying layer 105, into a γ-AlOOH solution. The second surface-modifying layer 106 may coat as a thin layer on the outer surface of the modified and activated support 101, for example, on the first surface-modifying layer 105 to reduce the surface roughness to a desired relative roughness for the modified and activated support 101.

In an exemplary embodiment, the obtained modified and activated support 101 may have a relative roughness in a nanometric scale of less than about 100 nm. Furthermore, the Pd layer 102 may have a similar relative roughness in a bottom side 102a (FIG. 1) that may resemble to the relative roughness of the upper side 101a of the modified and activated support 101.

In an exemplary implementation, the interstice layer 103 may have a thickness of less than about 100 nm that may be a thin or ultra-thin layer with a nanometric thickness. In an exemplary embodiment, the interstice layer 103 may be formed due to a surface activation process followed by Pd depositing process on the modified and activated support 101. The surface activation process may include an organic-inorganic activation process that may utilize a polymeric solution. In an exemplary embodiment, the polymeric solution may include a polymer matrix, and a plurality of Pd nanoparticles in the polymer matrix. In an exemplary embodiment, the polymer matrix may include one of poly-(ethylene glycol) (PEG), poly-(vinyl alcohol), poly-(vinyl pyrolidone), poly-(2,6-dimethyl-4-phenylene oxide), phenol resin, polyester, polyamide, polyimide, polyamide imido, polyvinyl chloride, poly-vinylidene chloride, poly-(ether sulfone), or combinations thereof.

In an exemplary embodiment of the present disclosure, a method for fabricating a composite membrane for Hydrogen separation and purification is disclosed. The composite membrane may include an exemplary composite membrane 100 (FIG. 1). The exemplary method may mainly include preparation of a Pd composite membrane that may primarily involves modification of a porous support, for example, a porous ceramic support; then, activation of the modified support and finally, deposition of a palladium layer on the activated support, for example, using an ELP method. In an exemplary scenario, an exemplary composite membrane 100 (FIG. 1) may be obtained using the disclosed method.

Figure 2:
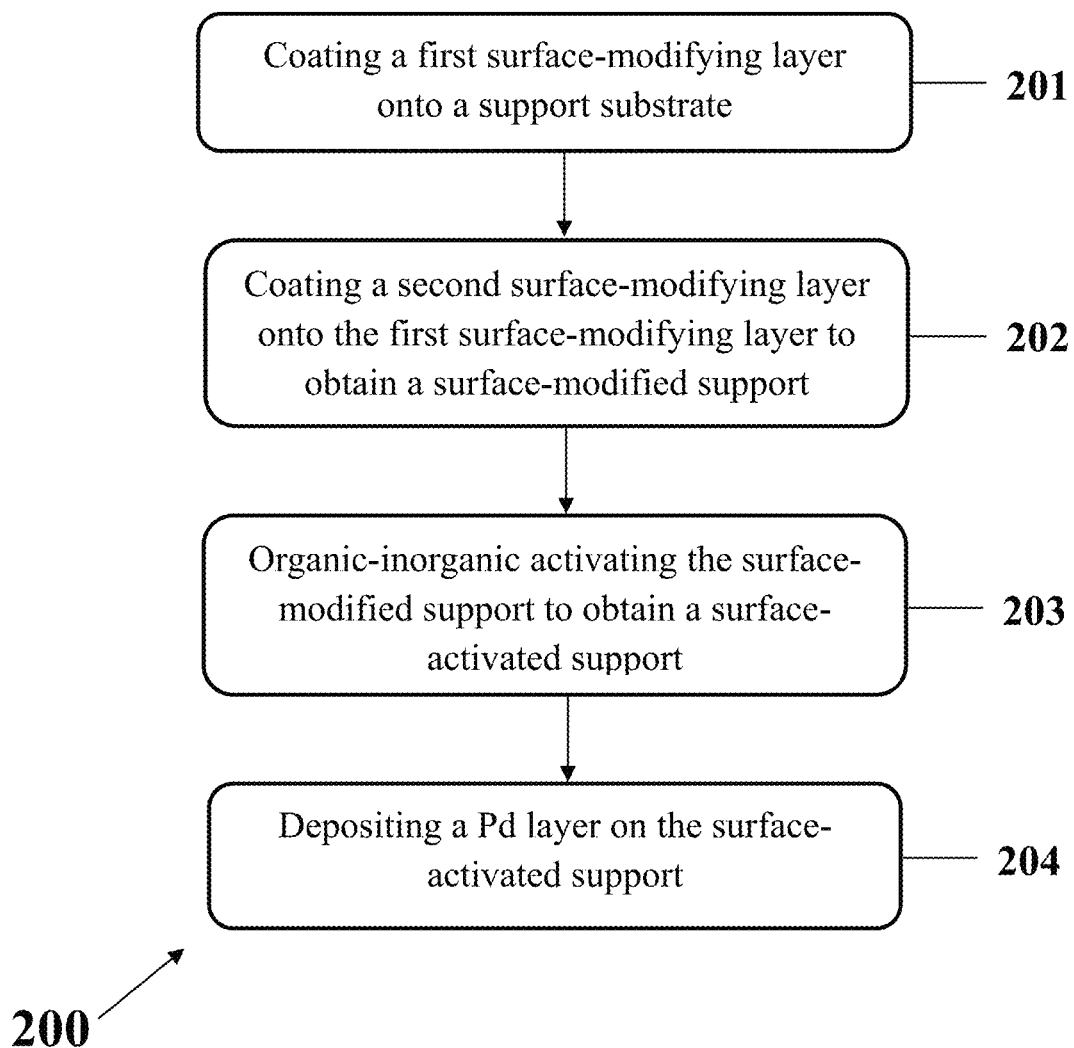
FIG. 2 illustrates a method for fabricating a composite membrane for hydrogen separation and purification, consistent with one or more exemplary embodiments of the present disclosure.

FIG. 2 shows method 200 for fabricating a composite membrane, for example, the composite membrane 100 (FIG. 1) for Hydrogen separation and purification, consistent with one or more exemplary embodiments of the present disclosure. Referring to this figure, the method 200 may include coating a first surface-modifying layer onto a support (step 201), coating a second surface-modifying layer onto the first surface-modifying layer to obtain a surface-modified support (step 202), organic-inorganic activating the surface-modified support to obtain a surface-activated support (step 203), and depositing a Pd layer on the surface-activated support (step 204).

In an exemplary implementation, the support may include for example, the support 104 (FIG. 1). The support may include a ceramic support, a metallic support, a glass support, a Vycor glass support, or combinations thereof. The support 104 may have a tubular, or platelet (disc) shape and may be fabricated utilizing one of processes, including gel-casting, extruding, injection molding, slip casting, compression molding, or combinations thereof. In an exemplary embodiment, the support substrate may include a tubular α-alumina support that may be fabricated from α-alumina powder using a gel-casting process.

In some exemplary implementations, the method 200 may further include fabricating the support, and cleaning the support. In an exemplary embodiment, fabricating the support may be done using one process of gel-casting, extruding, injection molding, slip casting, compression molding, or combinations thereof. The fabricated support may be cleaned in an acetone solution. After that, the support substrate may be cleaned in an ultrasonic bath. The support may be cleaned for a few minutes, for example, about 1 minutes to about 10 minutes.

In step 201 and 202, surface modifications may be performed on the support surface to control and obtain desired pore-size and relative roughness for the support. In step 201, a first surface-modifying layer 105 may be coated onto the surface of the support substrate 104. The first surface-modifying layer 105 may include a pore-size surface-modifying agent, which may include, for example, $TiO_2$, $SiO_2$, $CeO_2$, $ZrO_2$, $Y_2O_3$, Boehmite, γ-Alumina, or combinations thereof.

In an exemplary implementation, step 201 may include dipping the support substrate 104 in a solution or a suspension of a pore-size surface-modifying agent to obtain the first surface-modifying layer 105 coated on the support substrate 104, drying the first surface-modifying layer 105, and calcination/sintering the first surface-modifying layer 105.

In an exemplary implementation, the first surface-modifying layer 105 may be dried at ambient temperature. The first surface-modifying layer 105 may be calcined/sintered in an electric furnace. In an exemplary embodiment, step 201 may be repeated more than once to obtain a desired surface modification, for example, a desired pore-size modification or reduction.

In step 202, a second surface-modifying layer, for example, the second surface-modifying layer 106 may be coated onto the first surface-modifying layer 105 to obtain a surface-modified support, for example, the support 101. The second surface-modifying layer 106 may include a roughness surface-modifying agent, and the roughness surface-modifying agent may include one of $TiO_2$, $SiO_2$, $CeO_2$, $ZrO_2$, $Y_2O_3$, Boehmite, γ-Alumina, or combinations thereof.

In an exemplary implementation, step 202 may include dipping the support 104 that may be modified previously with the first surface-modifying layer 105 in a solution or a suspension of a roughness surface-modifying agent to obtain the surface-modified support, drying the surface-modified support, and calcination/sintering of the dried surface-modified support. In an exemplary embodiment, step 202 may be repeated more than once to obtain a desired surface modification, for example, to achieve more surface smoothness and to reduce the surface roughness.

In an exemplary embodiment, stresses in thin films and substrates may have three primary origins: intrinsic, thermal and mechanical. Thermal stress may arise due to changes in temperature when the film and substrates have different coefficients of thermal expansion (CTE). This type of stress may be unlikely for a Pd composite membrane on a ceramic support. Creating a small gap between the Pd layer 102 and the support 101 may omit the stresses associated with the Pd layer-support interaction. For this purpose, a combined organic-inorganic method followed by depositing a Pd layer may be applied on the surface-modified support to create a small gap, for example, the interstice layer 103.

In step 203, the surface-modified support obtained from step 202 may be subjected to an organic-inorganic activating process to obtain a surface-activated support. For example, the surface-modified support may be activated using a polymeric solution, which may include a polymer matrix, and a plurality of Pd nanoparticles in the polymer matrix. In an exemplary embodiment, the polymer matrix may include one of poly-(ethylene glycol) (PEG), poly-(vinyl alcohol), poly-(vinyl pyrolidone), poly-(2,6-dimethyl-4-phenylene oxide), phenol resin, polyester, polyamide, polyimide, polyamide imido, polyvinyl chloride, poly-vinylidene chloride, poly-(ether sulfone), or combinations thereof.

In an exemplary implementation, the organic-inorganic activating of the surface-modified support may include coating the surface-modified support with a layer of the polymeric solution. In an exemplary embodiment, the polymeric solution may include a polymer matrix, and a plurality of Pd nanoparticles in the polymer matrix. In an exemplary embodiment, the polymer matrix may include one of poly-(ethylene glycol) (PEG), poly-(vinyl alcohol), poly-(vinyl pyrolidone), poly-(2,6-dimethyl-4-phenylene oxide), phenol resin, polyester, polyamide, polyimide, polyamide imido, polyvinyl chloride, poly-vinylidene chloride, poly-(ether sulfone), or combinations thereof. For example, the surface-modified support may be coated by layer of Pd nanoparticles dispersed in a PEG matrix.

In an exemplary implementation, the polymeric solution may be synthesized by adding a chemical compound of Pd to the polymeric matrix. For example, a chemical compound of Pd may be added to PEG to obtain a mixture; the mixture may be mixed to obtain a solution; and the solution may be irradiated ultrasonically to obtain the polymeric solution. In an exemplary embodiment, a chemical compound of Pd, for example, palladium acetate may be added to a polymeric matrix, for example, PEG to obtain a mixture. The mixture may be mixed by stirring to obtain a solution. Then, the solution may be irradiated in an ultrasonic device to obtain the polymeric solution that may be used for organic-inorganic activating process.

In step 204, a Pd layer may be deposited on the surface-activated support. The Pd layer may be deposited on the surface-activated support via a process including pre-electroless plating of a first Pd layer on the surface-activated support, and electroless plating of a second Pd layer on the first Pd layer.

In an exemplary implementations, the Pd layer may be deposited on the outside surface of the activated support during a process, including depositing a first thin Pd layer on the surface-activated support via a pre-electroless plating process, and depositing a second dense Pd layer on the first Pd layer via an electroless plating process.

In an exemplary implementation, polymer matrix, for example, PEG may act as a reducing agent during pre-electroless plating of the first Pd layer on the surface-activated support so that no dense Pd layer may be formed. The polymer matrix, for example, PEG may be removed at high temperatures of about 873-973 K in air atmosphere, which may lead to formation of a small interstice, for example, the interstice layer 103 between the modified and activated support 101 and the thin pre-plated first Pd layer.

In an exemplary implementation, the polymer matrix may act as a mold, which may be removed during the deposition of the Pd layer. This may lead to obtain the first Pd layer with a bottom side that may have a roughness similar to a roughness of the surface of the surface-activated support. So, the first Pd layer may have a relative roughness resembling a relative roughness of the surface-activated support.

In an exemplary implementation, the second Pd layer may be deposited on the first Pd layer by a vacuum electroless plating process. The second Pd layer may be a dense Pd layer and both of the first Pd layer and the second Pd layer may form an exemplary uniform Pd layer 102 of an exemplary obtained composite membrane 100. The deposited uniform Pd layer may have an underside surface that may have a relative roughness resembling a relative roughness of the surface-activated support.

In an exemplary embodiment, relative support surface roughness may play an important role in the stability of the composite membrane. It may be expressed that the support surface roughness should be controlled to obtain a thin and defect-free Pd-based composite membrane with a high thermal stability. The smooth support surface may be dedicated as the main object to activate thin and defect-free Pd membrane. This phenomenon may be intensified with the gap formation between the Pd layer 102 and the activated and modified support 101, which may include the interstice layer 103 between the Pd layer 102 and the activated and modified support 101 disclosed herein. This explanation is further expanded upon below with additional details based on two approaches of thermal stability and mechanical stability.

Figure 3A:
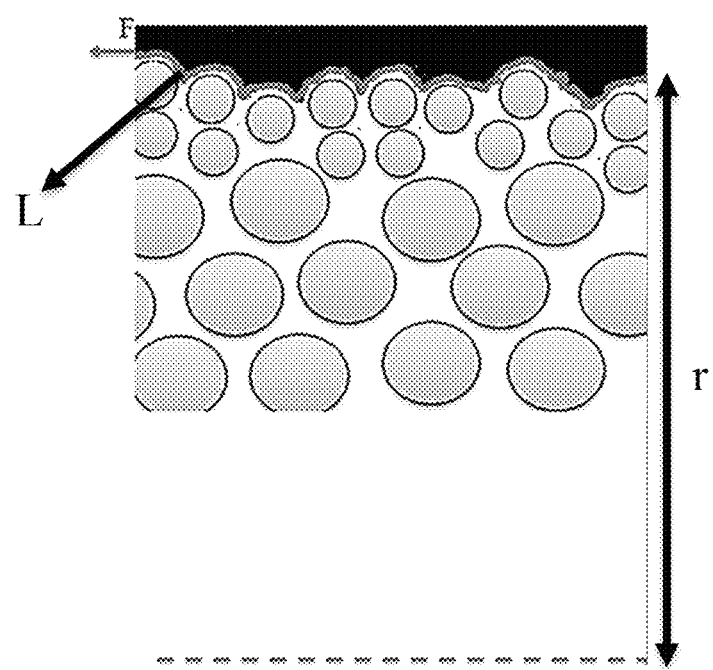
FIG. 3A illustrates a schematic of stresses caused on the Pd-ceramic composite membrane after elongation of a Pd layer on a surface-modified support without any γ-alumina layers on the $TiO_2$-Boehmite layer, consistent with one or more exemplary embodiments of the present disclosure.
Figure 3B:
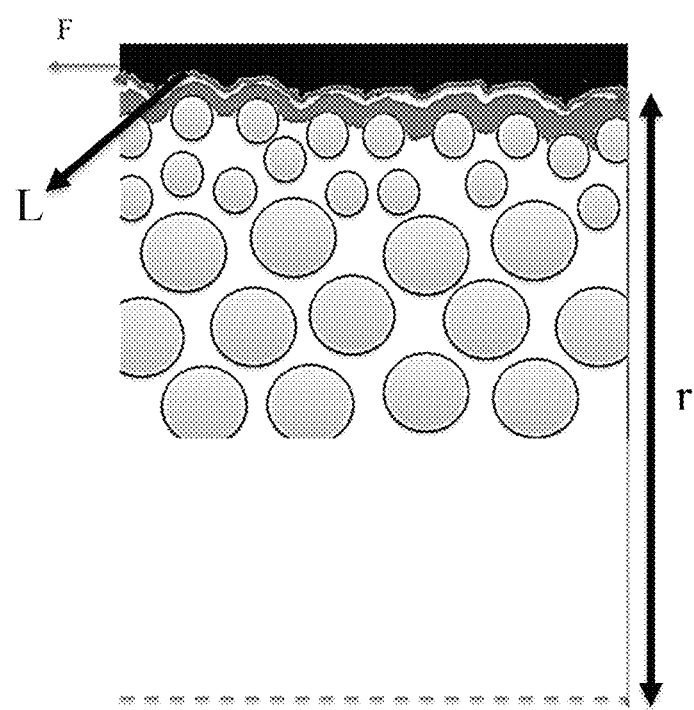
FIG. 3B illustrates a schematic of stresses caused on the Pd-ceramic composite membrane after elongation of a Pd layer on a surface-modified support with one γ-alumina layer on the $TiO_2$-Boehmite layer, consistent with one or more exemplary embodiments of the present disclosure.
Figure 3C:
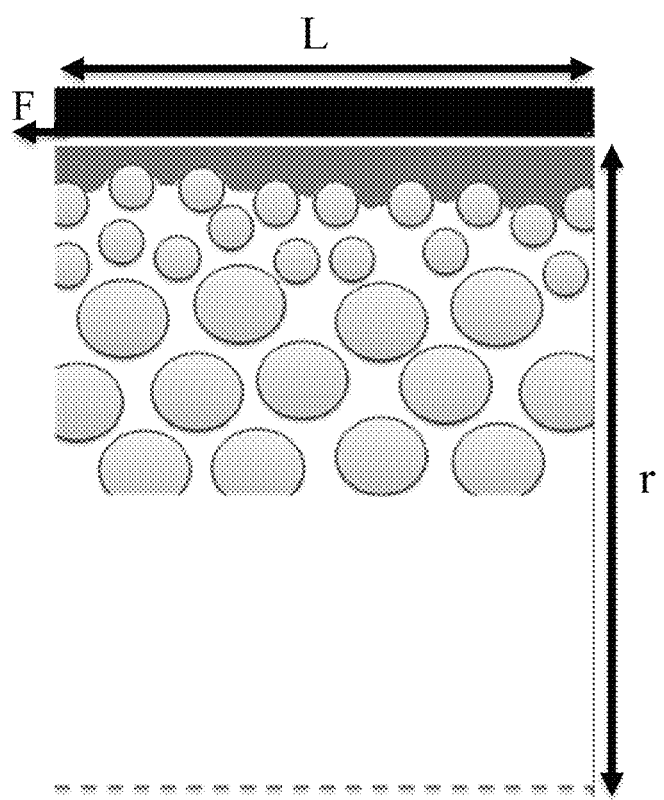
FIG. 3C illustrates a schematic of stresses caused on the Pd-ceramic composite membrane after elongation of a Pd layer on a surface-modified support with two γ-alumina layers on the $TiO_2$-Boehmite layer, consistent with one or more exemplary embodiments of the present disclosure.

The shear stress may be calculated from the following equation:

$$\tau = \frac{F}{2\pi r L} \qquad \text{Equation (1)}$$

where $\tau$ is shear stress, F shear force, r the tube radius and L a characteristic length in which the shear stress is active. Under thermal cycling and hydrogen loading, the shear stress for Pd-based supported membrane synthesized by a combined organic and inorganic method, that is disclosed herein, may be smaller than that for the membrane synthesized by conventional methods. An exemplary interstice layer between the Pd layer and the support may cause higher acting length (L) compared with conventional methods. Therefore, by applying the exemplary organic-inorganic method, the acting length may be equal to the membrane tube length and shear stress may decrease considerably (Equation (1)). While by increasing the modified support roughness in the presence of the interstice layer between the Pd layer and the support, the acting length may be enhanced due to the formation of a corrugated Pd layer, resulting in lower shear stress and more stable Pd composite membrane. FIGS. 3A-3C show schematic representations of forces (F), the tube radius (r), and the acting length (L) caused on the Pd-based composite membrane after elongation of the Pd layer on no (FIG. 3A), one (FIG. 3B), and two (FIG. 3C) γ-alumina layers on the support modified by $TiO_2$-Boehmite layer.

There may be different types of internal stresses during annealing that may be controlled with mechanical interlocking. There may be failure modes for compressed films which are susceptible to interface debonding or delamination. Buckling-driven delamination may occur if stresses are compressive. The failure mode may be analyzed with 2D solutions. Robust fail-safe criteria for ensuring that the respective failure modes will not occur, is:

$$\Omega = \frac{h\sigma^2}{E\Gamma} \qquad \text{Equation (2)}$$

Where h is a film thickness, $\sigma$ a stress, E a modulus, and $\Gamma$ a toughness. If the "cracking number", $\Omega$ is less than 2 (critical value), the failure mode may be excluded. The toughness may be lowest for very smooth surfaces, because a very smooth substrate may result in a continuous brittle intermetallic layer that may minimize the fracture path length. Therefore, relative roughness may cause higher toughness and lower stress which may result in lower cracking number.

Accordingly, it may be concluded that a relative roughness may be needed to obtain a more stable Pd composite membrane. So in some implementations, an activated modified support with two γ-alumina layer, that may cause a high smooth surface, may be bypassed. On the other hand, permeate flux may be another important parameter for the membrane selection which the overall flow resistance of gases permeating through the Pd composite membrane ($R_{membrane} = \Delta P/F_{membrane}$) may be equal to the sum of resistances in the modified support ($R_{modified\ support} = \Delta P/F_{modified\ support}$) and the Pd top layer ($R_{Pd-layer} = \Delta P/F_{Pd-layer}$). Therefore, the permeation resistance of modified support may have a crucial effect on the final membrane hydrogen flux. The investigated permeation results in the exemplary embodiments contained in the present disclosure may show that applying one γ-alumina layer on the $TiO_2$-Boehmite modified support may result in a considerable increase in the permeation resistance. Then, a modified support with two $TiO_2$-Boehmite layers may be selected as a more appropriate choice according to the preferred objects of the present disclosure, including relative roughness and low permeation resistance of the modified support.

EXAMPLES

Example 1: Fabrication of a Composite Membrane

In this example, an exemplary composite membrane 100 was fabricated and was used for an exemplary hydrogen separation and purification process. Firstly, homemade tubular alumina supports with average pore size of about 570 nm, porosity about 38%, outer diameter of about 10 mm, a length of about 75 mm were made from high-quality α-$Al_2O_3$ powder via a gel-casting method. After cleaning the non-modified support in an acetone solution in an ultrasonic bath for about 1 minutes to about 10 minutes, intermediate layers were applied. For example, to achieve different surface roughness, three types of surface modifications were applied as follows:

$TiO_2$-Boehmite layer was obtained by dipping the support in a $TiO_2$-Boehmite suspension for about 20 seconds to about 40 seconds. The coated layer was dried for about 12 hours to about 36 hours at ambient temperature and was sintered at about 1173K to 1373 K for about 2 hours to about 4 hours in an electric furnace. The procedure was repeated twice. In order to reduce the surface roughness, the $TiO_2$-bohemite modified support was dipped into a γ-AlOOH solution for about 10 seconds to about 30 seconds and then dried in air at room temperature for about 12-36 hours and calcined/sintered at about 823 K 923 K for about 3 hours. In order to reach a high surface smoothness, the second procedure may be repeated.

In the next step, the surface modified support was activated by an organic-inorganic method using a solution of Pd nanoparticles in a PEG matrix. For synthesis of palladium nanoparticles in PEG matrix, palladium acetate was added into the polymeric matrix at a temperature above the melting point of PEG by magnetic stirring. The process then was followed by ultrasonic irradiation of solution for about 1 hours to 2 hours at the same temperature. The modified support was coated with the synthesized polymer solution containing nanoparticles of Pd in PEG matrix (about 0.5-1 wt. %). Pd nanoparticles were used as a catalyst for electroless plating of Pd membrane.

After the surface activation, a Pd layer was deposited on the outside surface of the activated support during two steps. Firstly, pre-electroless plating was carried out using plating solution involving palladium chloride (about 2 gL$^{-1}$) and EDTA sodium as a stabilizer at a temperature of about 343-353 K. In this step, PEG acts as a reducing agent and no dense Pd layer was formed. The organic layer was removed at high temperatures of about 873-973 K in air atmosphere, which caused in formation of a small interstice between the support and the thin pre-plated Pd layer. The obtained layer temperature was reduced to about 773-823 K and kept for about 3 hours to be activated for a formal electroless plating. After pre-plating and formation of a thin Pd layer, a dense Pd layer was deposited by the conventional vacuum electroless plating. In this step, the plating solution included $PdCl_2$ (about 3.6 gL$^{-1}$), $Na_2EDTA$ (about 76 gL$^{-1}$), ammonia (about 650 mlL$^{-1}$) and hydrazine (about 10 mlL$^{-1}$). The whole bath system was placed in a thermostat chamber maintained at a temperature of about 313-343 K by vacuuming inside a tubular support using a vacuum pump. The obtained palladium composite membrane was cleaned with ammonia solution and hot deionized water in sequence and dried at about 393 K. Finally, the palladium membranes were annealed at a temperature of about 773-823 K for approximately about 2-5 hours in a hydrogen atmosphere.

Figure 4A:
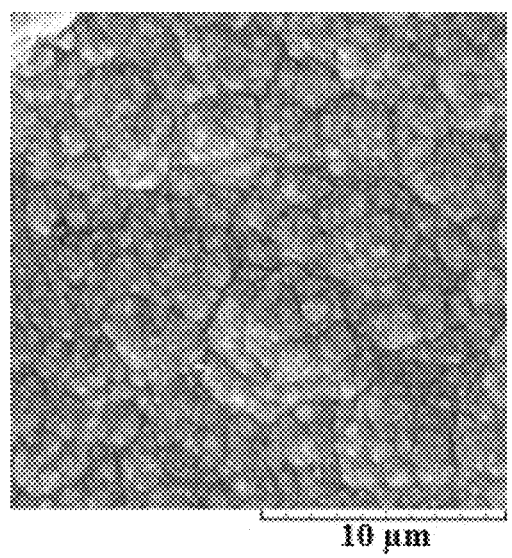
FIG. 4A illustrates an SEM micrograph of the surfaces-section of a fabricated Pd composite membrane after three steps of platting-annealing, consistent with one or more exemplary embodiments of the present disclosure.
Figure 4B:
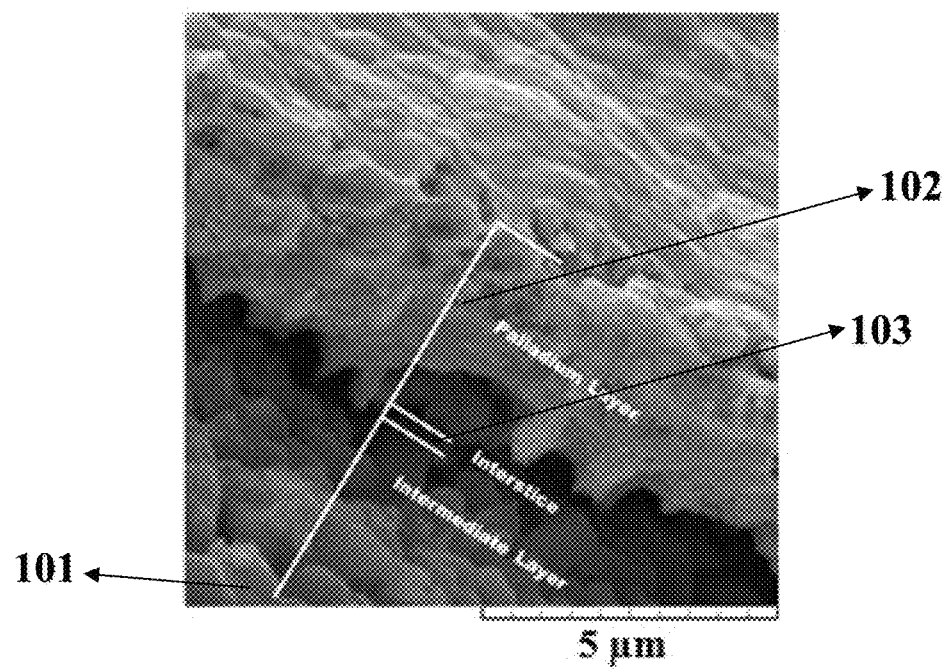
FIG. 4B illustrates an SEM micrograph of the cross-section of a fabricated Pd composite membrane after three steps of platting-annealing, consistent with one or more exemplary embodiments of the present disclosure.
Figure 4C:
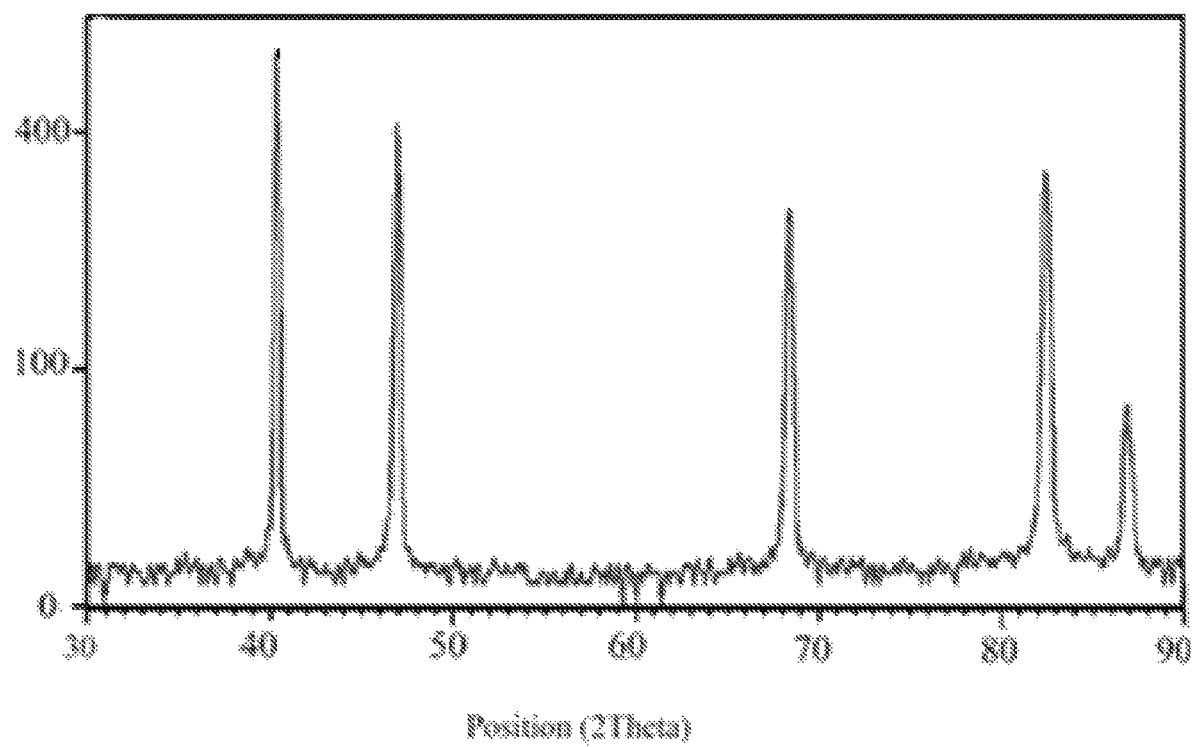
FIG. 4C illustrates an XRD pattern of a fabricated Pd composite membrane after three steps of platting-annealing, consistent with one or more exemplary embodiments of the present disclosure.

FIGS. 4A-4C show an SEM micrograph of the surfaces-section (FIG. 4A), an SEM micrograph of the cross-section (FIG. 4B), and an XRD pattern (FIG. 4C) of a fabricated Pd composite membrane after three steps of platting-annealing in the present example. The prepared Pd membrane has a fine and uniform microstructure tightly packed together forming the dense Pd layer 102 with no pinhole as illustrated in FIG. 4A. Also, FIG. 4B shows the cross-section image of Pd membrane 102 that indicates a thin Pd layer (3-4 μm) 102 deposited tightly on the surface of the porous support 101 with the interstice layer 103 between them. It may be observed that the lower surface of the Pd layer 102 has a similar roughness to the upper layer of the support 101. The peaks of XRD pattern in FIG. 4C are assigned to the crystalline cubic form of metallic palladium.

Example 2: Investigation of the Effect of Different Surface Modifications

Three different exemplary composite membranes with different surface modifications were fabricated, including membranes with no γ-alumina layer, one no γ-alumina layer, and two no γ-alumina layers on the $TiO_2$-Boehmite layer.

Figure 5A:
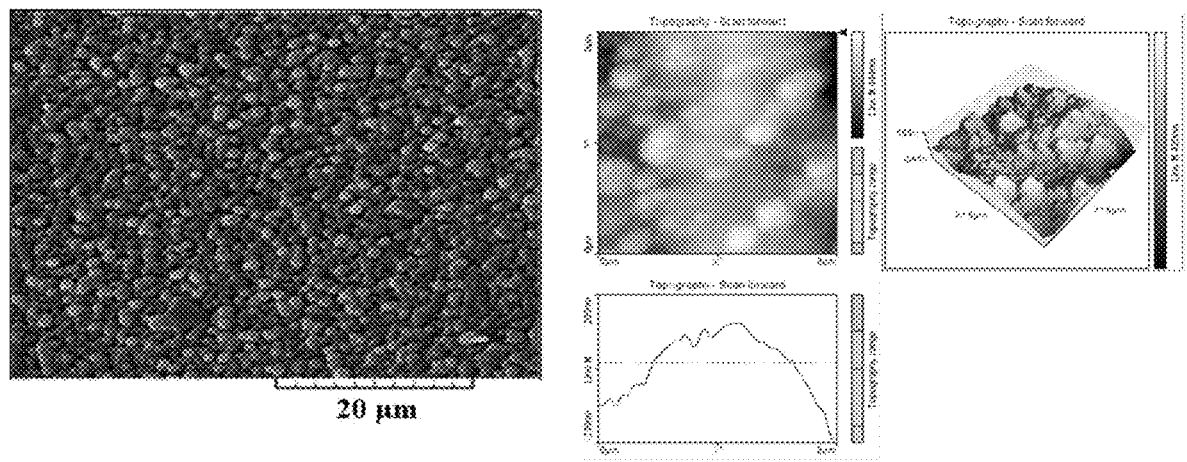
FIG. 5A illustrates a SEM image (left) and an AFM image (right) of a surface-modified support without a γ-alumina layer on the $TiO_2$-Boehmite layer, consistent with one or more exemplary embodiments of the present disclosure.
Figure 5B:
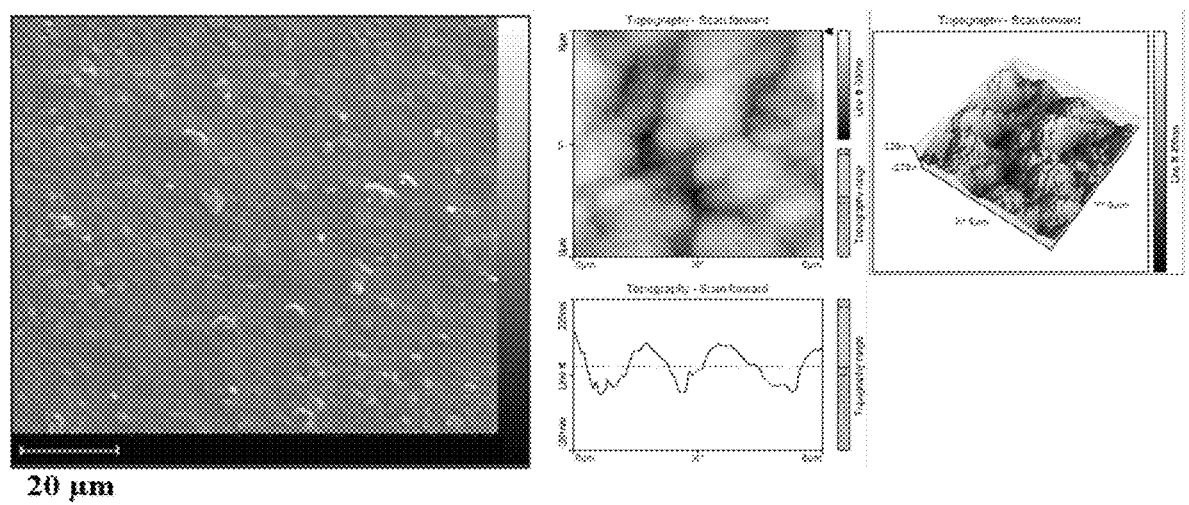
FIG. 5B illustrates a SEM image (left) and an AFM image (right) of a surface-modified support with one γ-alumina layer on the $TiO_2$-Boehmite layer, consistent with one or more exemplary embodiments of the present disclosure.
Figure 5C:
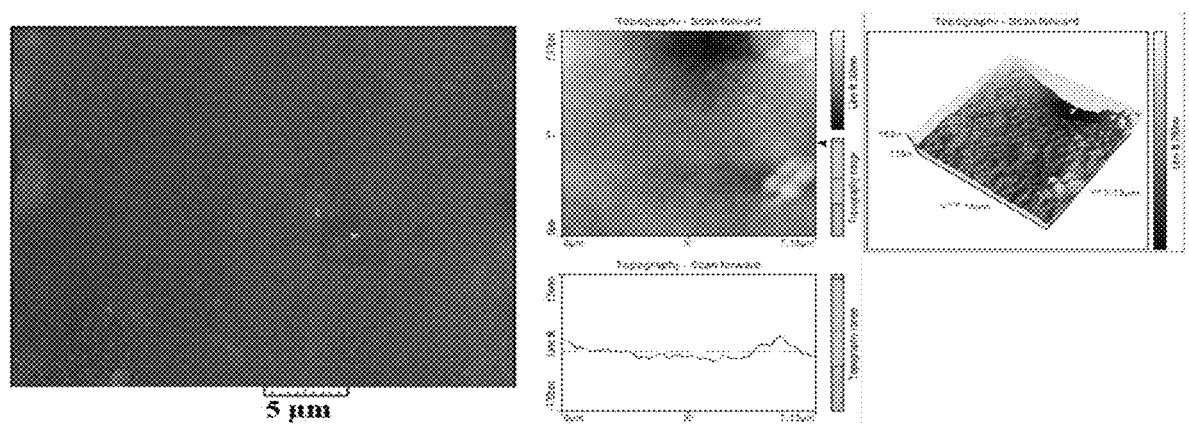
FIG. 5C illustrates a SEM image (left) and an AFM image (right) of a surface-modified support with two γ-alumina layer on the $TiO_2$-Boehmite layer, consistent with one or more exemplary embodiments of the present disclosure.

FIGS. 5A-5C show SEM (left) and AFM (right) images of different support modifications. FIG. 5A shows a SEM image (left) and an AFM (right) image of a support with a surface modification with only $TiO_2$-Boehmite and no γ-alumina layer was deposited. FIG. 5B shows a SEM image (left) and an AFM (right) image of a support with a surface modification of one γ-alumina layer on the $TiO_2$-Boehmite layer. FIG. 5C shows a SEM image (left) and an AFM (right) image of a support with a surface modification of two γ-alumina layer on the $TiO_2$-Boehmite layer. It may be observed that by adding a γ-alumina layer, the smoothing of the surface increases and the roughness of the surface decreases.

Figure 6A:
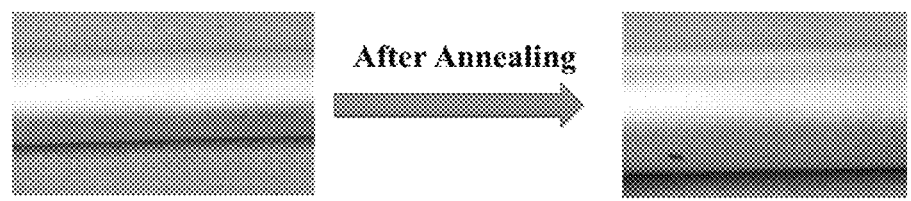
FIG. 6A illustrates a Pd membrane with no γ-alumina layer on a $TiO_2$-Boehmite modified support before (left) and after (right) annealing at 823 K, consistent with one or more exemplary embodiments of the present disclosure.
Figure 6B:
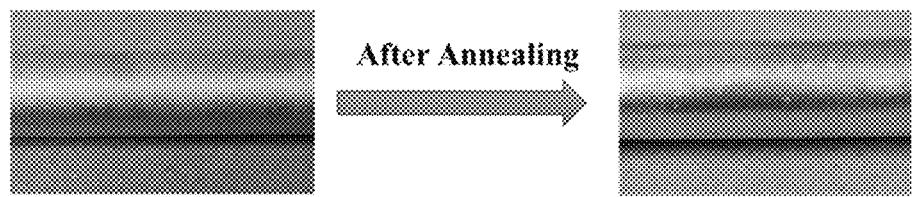
FIG. 6B illustrates a Pd membrane with one γ-alumina layer on a $TiO_2$-Boehmite modified support before (left) and after (right) annealing at 823 K, consistent with one or more exemplary embodiments of the present disclosure.
Figure 6C:
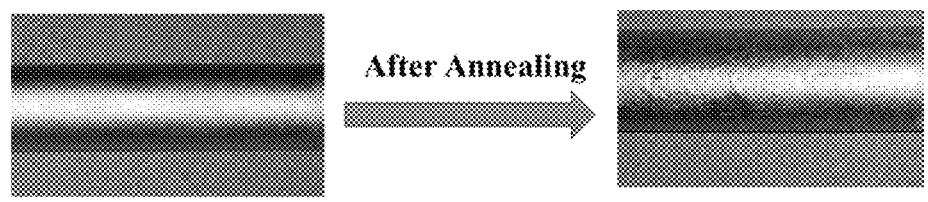
FIG. 6C illustrates a Pd membrane with two γ-alumina layers on a $TiO_2$-Boehmite modified support before (left) and after (right) annealing at 823 K, consistent with one or more exemplary embodiments of the present disclosure.

FIGS. 6A-6C show Pd membranes with no (FIG. 6A), one (FIG. 6B), and two (FIG. 6C) γ-alumina layers on a $TiO_2$-Boehmite modified support before (left) and after (right) annealing at about 823 K. The Ar leak for these three membranes was measured as $7.01 \times 10^{-10}$ mol/m$^2 \cdot$s$\cdot$Pa (FIG. 6A), $6.51 \times 10^{-10}$ mol/m$^2 \cdot$s$\cdot$Pa (FIG. 6B), and $1.01 \times 10^{-10}$ mol/m$^2 \cdot$s$\cdot$Pa (FIG. 6C) while it was $0.00 \times 10^{-10}$ mol/m$^2 \cdot$s$\cdot$Pa before annealing process for all three membranes. After the first conventional vacuum ELP on the modified surface of the support, the Ar permeation measurements indicated that the prepared membranes are gas-tight and no leakage was found during the permeation test. However, after annealing in hydrogen atmosphere, the palladium membrane deposited on the activated support modified with two γ-alumina layers was peeled off (FIG. 6C). But a uniform Pd layer was observed when no or one γ-alumina layer was applied during the modification of the support (FIGS. 6A and 6B).

Figure 7A:
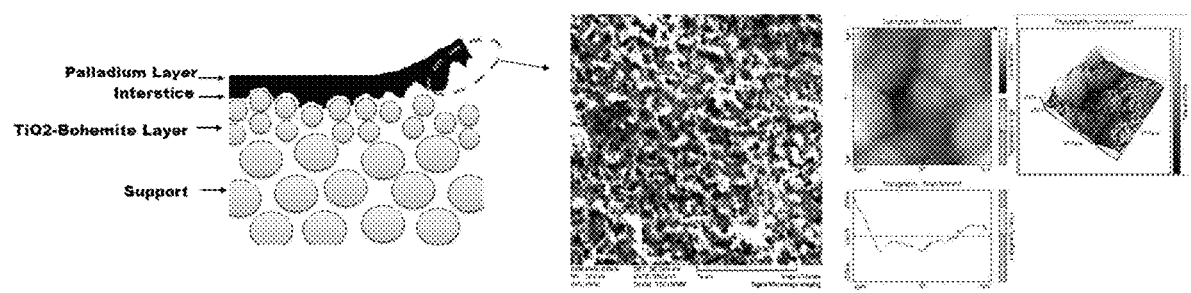
FIG. 7A illustrates a schematic (left), a SEM image (middle), and an AFM result (right) of a back part of a peeled off Pd membrane on a support with no γ-alumina layer on $TiO_2$-Boehmite layer, consistent with one or more exemplary embodiments of the present disclosure.
Figure 7B:
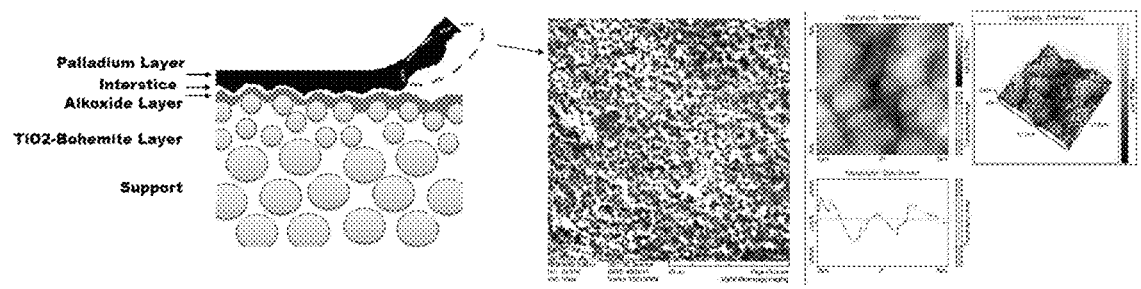
FIG. 7B illustrates a schematic (left), a SEM image (middle), and an AFM result (right) of a back part of a peeled off Pd membrane on one γ-alumina layer on $TiO_2$-Boehmite layer, consistent with one or more exemplary embodiments of the present disclosure.
Figure 7C:
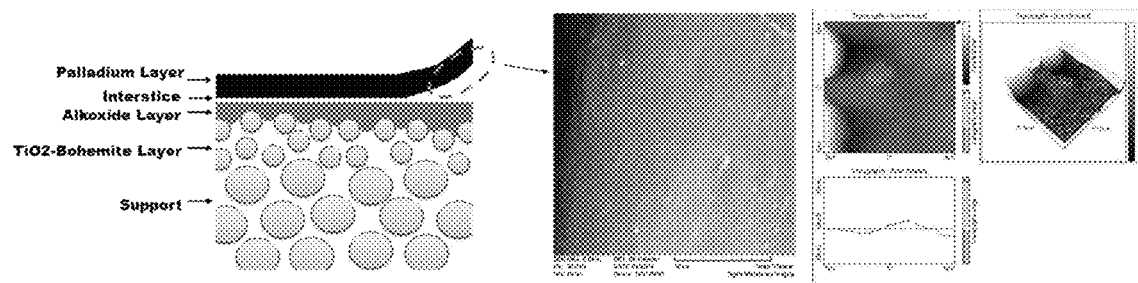
FIG. 7C illustrates a schematic (left), a SEM image (middle), and an AFM result (right) of a back part of a peeled off Pd membrane on two γ-alumina layer on $TiO_2$-Boehmite layer, consistent with one or more exemplary embodiments of the present disclosure.

FIGS. 7A-7C show a schematic (left), a SEM image (middle), and an AFM result (right) of the back of a peeled off Pd membrane on no (FIG. 7A), one (FIG. 7B), and two (FIG. 7C) γ-alumina layer on TiO$_2$-Boehmite layer of the three produced composite membranes. The completely different surface roughness or smoothness and different surface structures may suggest that the relative support surface roughness plays an important role in the stability of the Pd membranes as described hereinabove.

Example 3: H$_2$ Permeation of the Fabricated Composite Membranes

Generally, the rate of hydrogen permeation may be expressed as follows:

$$J = Q(P_R^n - P_P^n) \quad \text{Equation (2)}$$

Where J is hydrogen permeation flux, Q hydrogen permeance, $P_R$ the hydrogen partial pressures in the retentate, $P_P$ the hydrogen partial pressures in the permeate, and n the pressure dependence factor (0.5-1). The factor n is equal to 0.5 when bulk diffusion through dense Pd layer is the rate-controlling step, while the surface process of hydrogen dissociation adsorption and associative desorption is rate-controlling step, n becomes equal to 1. An exponent of unity (n=1) suggests that permeation through palladium may be very fast and usually may indicate that the palladium layer is thin (less than 5 μm).

Figure 8:
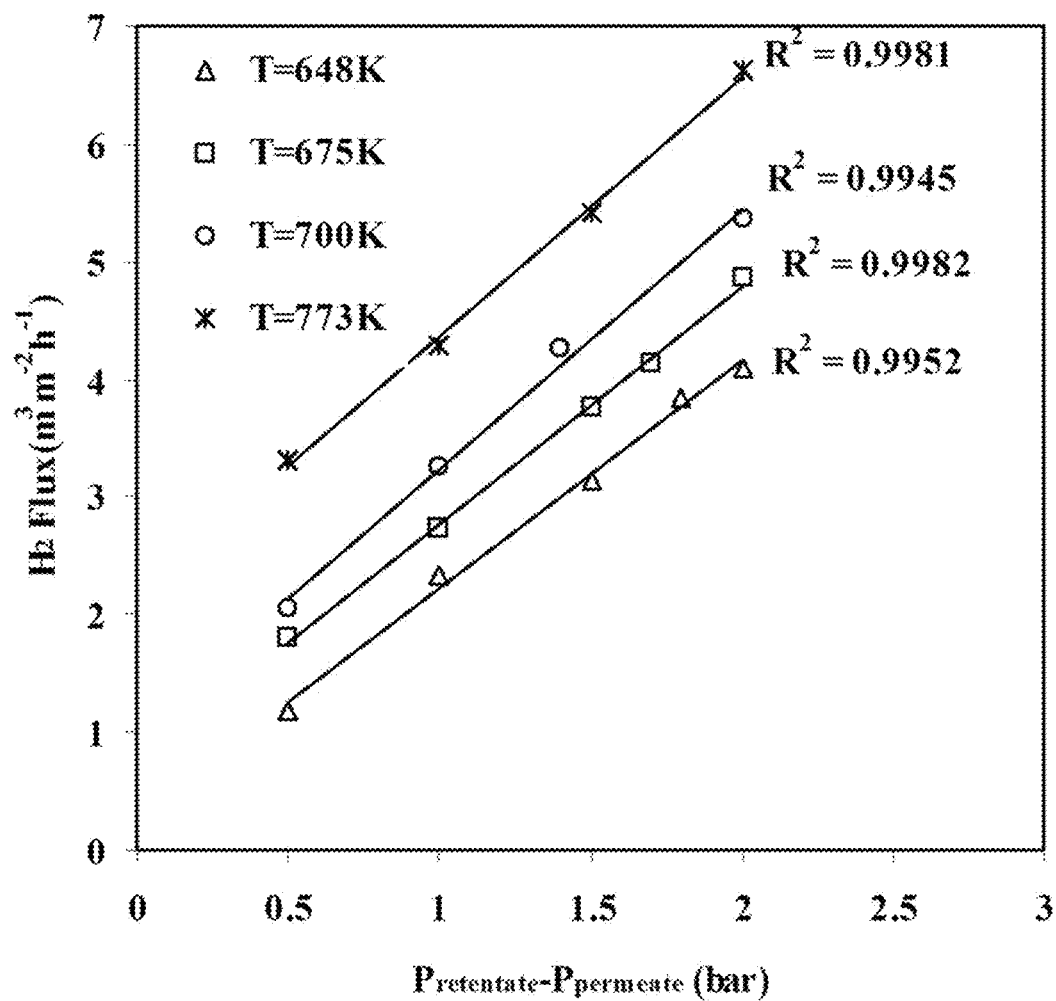
FIG. 8 illustrates hydrogen flux versus operating pressure difference at different temperatures, consistent with one or more exemplary embodiments of the present disclosure.

FIG. 8 shows hydrogen flux versus operating pressure difference at different temperatures. As shown in this figure, hydrogen flux is linearly proportional to the pressure difference across the membrane at the investigated temperatures and therefore the pressure exponent n is very close to 1. The obtained results confirm the formation of thin Pd composite membrane by the modified electroless plating method as developed herein.

Figure 9:
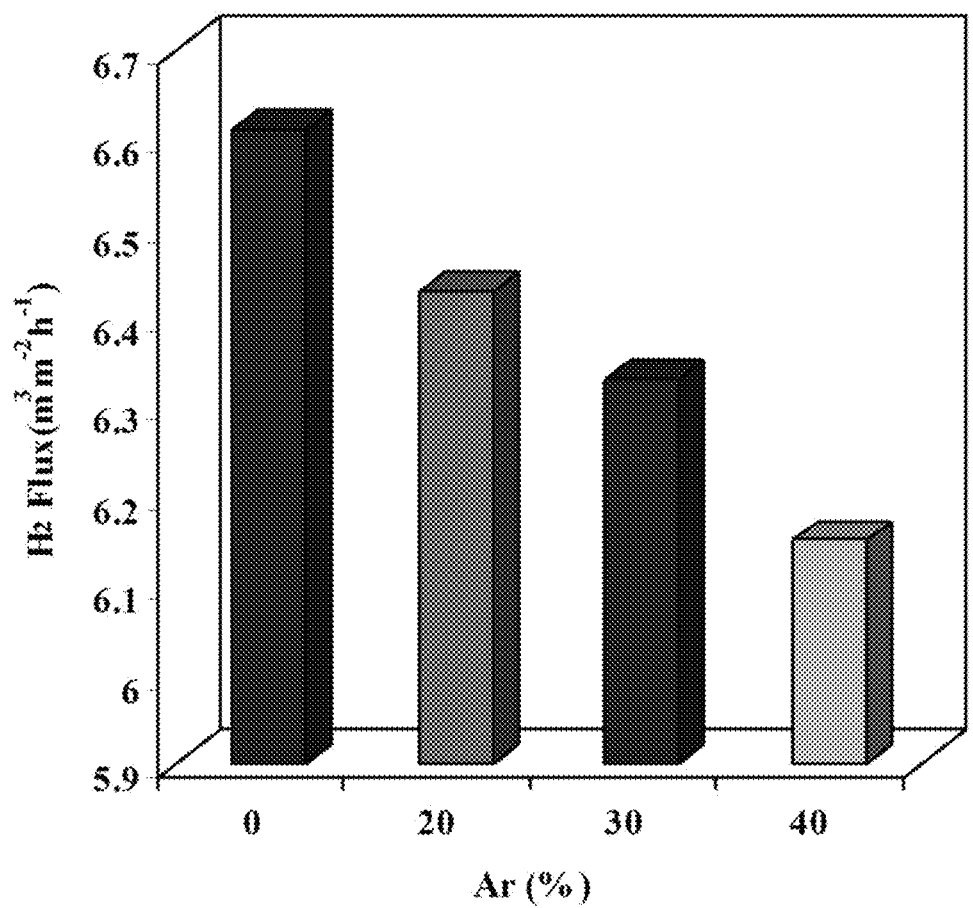
FIG. 9 illustrates hydrogen flux (shell side) for $Ar/H_2$ feed mixture at 773 K and 2 bar, consistent with one or more exemplary embodiments of the present disclosure.

Performance of the prepared Pd membrane was evaluated by binary gas mixtures of Hz and Ar permeation tests. The Ar single gas and H$_2$—Ar binary mixtures permeation tests confirm that no Ar permeation was determined by GC analyzer at different temperatures and pressures. The presence of other gases in the feed stream can affect the hydrogen permeation flux through the Pd membrane. For example, FIG. 9 shows the obtained results of binary gas mixture (H$_2$—Ar) at temperature of about 773 K and pressure difference of about 2 bar. It should be noted that a clear decrease in the hydrogen flux is observed in comparison with the similar test in pure H$_2$. This behavior may be attributed to the dilution effect on the Pd surface.

Figure 10:
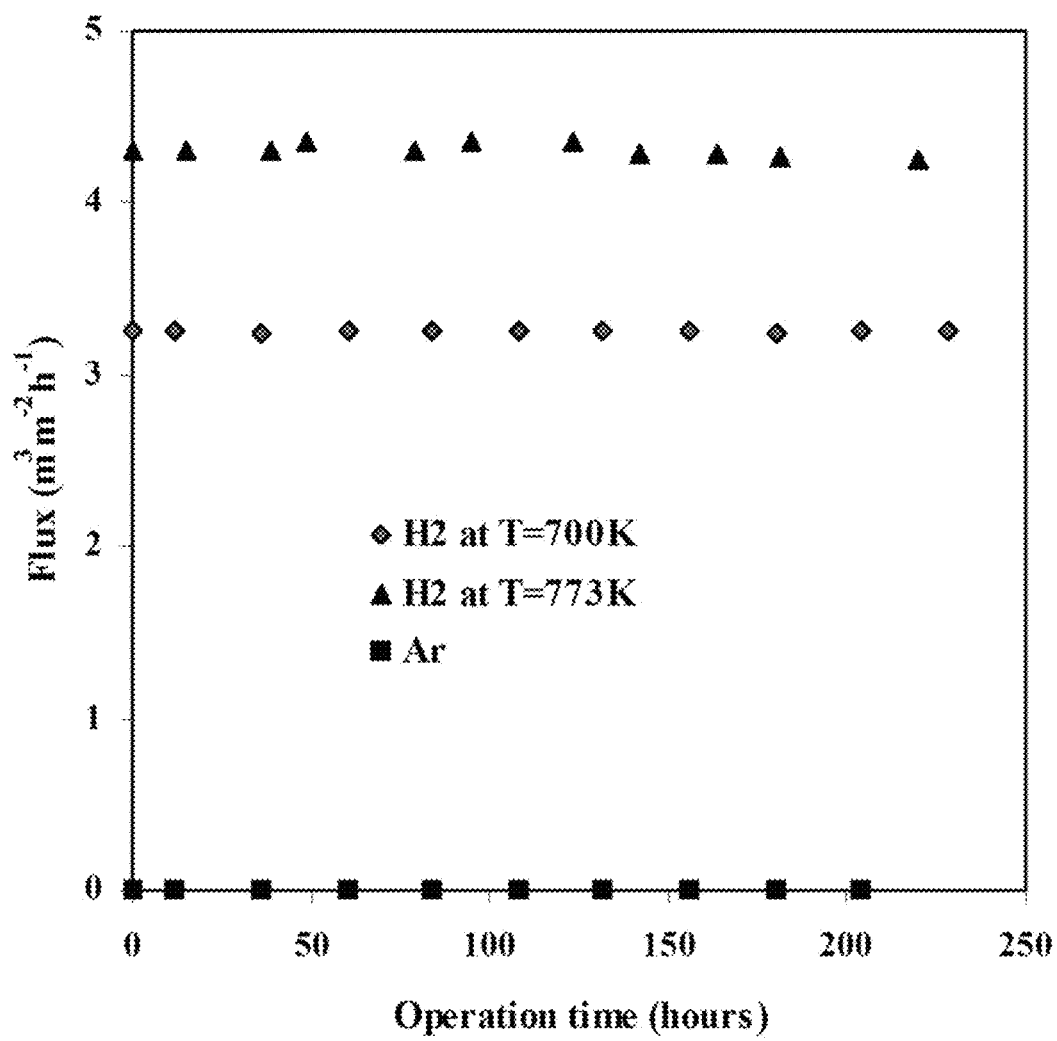
FIG. 10 illustrates hydrogen flux versus operating time with gas exchanging cycles at 700 and 773 K with a pressure difference of 1 bar, consistent with one or more exemplary embodiments of the present disclosure.

The hydrogen flux at temperatures of about 700 K and about 773 K and pressure difference of about 1 bar versus the operating time is measured and the results are shown in FIG. 10. No significant changes of hydrogen flux are observed within the long operating time of about 240 hours. The gas exchange cycle between hydrogen and other inert gas (Ar) was used during the operation time to check the stability of the membrane. The measurement of the Ar leak during long-time operation progressively proved that the hydrogen separation factor still is infinite under experimental conditions. Therefore, the obtained results indicate that the prepared Pd membrane has very good stability.

What is claimed is:

1. A method for fabricating a composite membrane, the method comprising:
    coating a first surface-modifying layer onto a support comprising coating a pore-size surface-modifying agent onto the support; and
    obtaining a surface-modified support with a relative roughness in a nanometric scale of less than 100 nm by coating a second surface-modifying layer onto the first surface-modifying layer comprising coating a roughness surface-modifying agent onto the first surface-modifying layer;
    obtaining a surface-activated support by organic-inorganic activating the surface-modified support; and
    depositing a Pd layer on the surface-activated support;
    wherein:
    coating the first surface-modifying layer onto the support comprises coating one or more TiO$_2$-Boehmite layers onto the support, and
    coating the second surface-modifying layer onto the first surface-modifying layer comprises coating one or more γ-alumina layers onto the first surface-modifying layer.

2. The method of claim 1, wherein:
    the support has tubular or platelet shape, and
    the support comprises at least one of ceramic support, metallic support, glass support,
    and combinations thereof.

3. The method of claim 2, wherein the method further comprises:
    fabricating the support by at least one of gel-casting, extruding, injection molding, slip casting, compression molding, and combinations thereof; and
    cleaning the fabricated support.

4. The method of claim 3, wherein fabricating the support comprises fabricating a tubular α-alumina support from α-alumina powder using a gel-casting process.

5. The method of claim 1, wherein each of coating the first surface-modifying layer and coating the second surface-modifying layer comprises coating at least one of TiO$_2$, SiO$_2$, CeO$_2$, ZrO$_2$, Y$_2$O$_3$, Boehmite, γ-Alumina, and combinations thereof.

6. The method of claim 1, wherein coating the first surface-modifying layer onto the support comprises:
    dipping the support in a solution or a suspension of the pore-size surface-modifying agent to obtain the first surface-modifying layer coated on the support substrate;
    drying the first surface-modifying layer; and
    calcination/sintering the first surface-modifying layer in an electric furnace.

7. The method of claim 1, wherein coating the second surface-modifying layer onto the first surface-modifying layer comprises:
    dipping the support substrate including the first surface-modifying layer in a solution or a suspension of the roughness surface-modifying agent to obtain the surface-modified support;
    drying the surface-modified support; and
    calcination/sintering of the dried surface-modified support.

8. The method of claim 1, wherein organic-inorganic activating the surface-modified support comprises coating a layer of a polymeric solution on the surface-modified support, wherein the polymeric solution comprises:
a polymer matrix; and
a plurality of Pd nanoparticles in the polymer matrix.

9. The method of claim 8, wherein the polymer matrix comprises at least one of poly-(ethylene glycol) (PEG), poly-(vinyl alcohol), poly-(vinyl pyrolidone), poly-(2,6-dimethyl-4-phenylene oxide), phenol resin, polyester, polyamide, polyimide, polyamide imido, polyvinyl chloride, poly-vinylidene chloride, poly-(ether sulfone), and combinations thereof.

10. The method of claim 1, wherein depositing the Pd layer on the surface-activated support comprises:
pre-electroless plating of a first Pd layer on the surface-activated support; and
electroless plating of a second Pd layer on the first Pd layer to obtain the Pd layer deposited on the surface-activated support,
wherein, an underside surface of the Pd layer has a relative roughness resembling a relative roughness of the surface-activated support.

11. The method of claim 10, wherein electroless plating of the second Pd layer on the first Pd layer comprises vacuum electroless plating (VELP) of the second Pd layer on the first Pd layer.

12. The method of claim 1, wherein:
a respective relative roughness of a bottom side of the Pd layer is equal to the relative roughness of the surface-modified support.

13. A method for fabricating a composite membrane, the method comprising:
fabricating a tubular α-alumina support from α-alumina powder using a gel-casting process;
coating a first surface-modifying layer onto a support comprising coating one or more layers of a pore-size surface-modifying agent onto the support, the pore-size surface-modifying agent comprising $TiO_2$-Boehmite;
obtaining a surface-modified support with a controlled roughness in a nanometric scale of less than 100 nm by coating a second surface-modifying layer onto the first surface-modifying layer comprising coating one or more layers of a roughness surface-modifying agent onto the first surface-modifying layer, the roughness surface-modifying agent comprising γ-alumina;
obtaining a surface-activated support by organic-inorganic activating the surface-modified support; and
depositing a Pd layer on the surface-activated support.

* * * * *